United States Patent [19]

Salisbury

[11] 3,947,260

[45] Mar. 30, 1976

[54] METHOD OF SEALING AND SPACING GLASS SUBSTRATES OF GASEOUS DISCHARGE DISPLAY PANELS USED AT HIGH ALTITUDES

[75] Inventor: Charles W. Salisbury, Risingsun, Ohio

[73] Assignee: Owens-Illinois, Inc., Toledo, Ohio

[22] Filed: Jan. 2, 1975

[21] Appl. No.: 537,896

[52] U.S. Cl. ............................. 65/42; 65/43; 65/58
[51] Int. Cl.² ......................................... C03B 23/24
[58] Field of Search ............... 65/36, 42, 43, 38, 58; 313/220, 221, 217, 188

[56] References Cited
UNITED STATES PATENTS
1,448,351 3/1923 Kirlin ................................. 65/58 X
3,778,126 12/1973 Wilson ............................. 313/220 X
3,837,724 9/1974 Haberland et al. ............. 313/220 X
3,862,830 1/1975 Stern ................................... 65/43 X

*Primary Examiner*—Arthur D. Kellogg
*Attorney, Agent, or Firm*—Donald Keith Wedding

[57] ABSTRACT

A low melting, transparent glass spacer rod system is disclosed which will soften and seal the two glass substrates in the center of a gaseous discharge panel at or below the temperature used to seal the periphery but above the gas processing temperature thus relieving the stresses developed at the edge seal when the gas within the panel expands at high altitudes. High melting rods near the seal periphery provide the proper gap spacing between substrates.

11 Claims, No Drawings

METHOD OF SEALING AND SPACING GLASS SUBSTRATES OF GASEOUS DISCHARGE DISPLAY PANELS USED AT HIGH ALTITUDES

BACKGROUND OF THE INVENTION

This invention relates to the manufacture of gas discharge devices, especially A.C. (alternating current) multiple gas discharge display/memory devices which have an electrical memory and which are capable of producing a visual display or representation of data such as numerals, letters, radar displays, aircraft displays, binary words, educational displays, etc.

Multiple gas discharge display and/or memory panels of one particular type with which the present invention is concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member typically being appropriately oriented so as to define a plurality of discrete gas discharge units or cells.

In some prior art panels the discharge cells are additionally defined by surrounding or confining physical structure such as apertures in perforated glass plates and the like so as to be physically isolated relative to other cells. In either case, with or without the confining physical structure, charges (electrons, ions) produced upon ionization of the elemental gas volume of a selected discharge cell, when proper alternating operating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of substantial conductive current from the conductor members to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge cells is disclosed in U.S. Pat. No. 3,499,167 (incorporated herein by reference) issued to Theodore C. Baker, et al.

An example of a panel containing physically isolated cells is disclosed in the article by D. L. Bitzer and H. G. Slottow entitled "The Plasma Display Panel - A Digitally Addressable Display With Inherent Memory", Proceeding of the Fall Joint Computer Conference, IEEE, San Francisco, Cal., November 1966, pages 541-547 and also in U.S. Pat. No. 3,559,190 (incorporated herein by reference).

In the construction of the panel, a continuous volume of ionizable gas is confined between a pair of dielectric surfaces backed by conductor arrays typically forming matrix elements. The two conductor arrays may be orthogonally related sets of parallel lines (but any other configuration of conductor arrays may be used). The two arrays define at their intersections a plurality of opposed pairs of charge storage areas on the surfaces of the dielectric bounding or confining the gas. Thus, for a conductor matrix having H rows and C columns the number of elemental or discrete areas will be twice the number of elemental discharge cells.

In addition, the panel may comprise a so-called monolithic structure in which the conductor arrays are created on a signle substrate and wherein two or more arrays are separated from each other and from the gaseous medium by at least one insulating member. In such a device the gas discharge takes place not between two opposing elemental areas on two different substrates, but between two contiguous or adjacent elemental areas on the same substrate; the gas being confined between the substrate and an outer retaining wall.

It is also feasible to have a gas discharge device wherein some of the conductive or electrode members are in direct contact with the gaseous medium and the remaining electrode members are appropriately insulated from such gas, i.e., at least one insulated electrode.

In the prior art there exists D.C. (direct current) devices where the electrodes consist of an anode and a cathode which are typically in direct contact with the ionizable gaseous medium. It is also possible to construct such D.C. devices utilizing a dielectric overcoat, i.e., the same structure and configuration as an A.C. gas discharge display/memory panel described hereinbefore.

A wide variety of such devices exist in the prior art. Examples of such devices are disclosed in U.S. Pat. Nos. 2,142,106; 3,260,880; 3,720,452; 3,725,713; 3,237,040, and 3,497,751, all of which are incorporated herein by reference.

The present invention is intended to relate to the manufacture of all types of A.C. and D.C. display panels.

In addition to the matrix configuration, the conductor arrays of the display device (D.C. or A.C.) may be shaped otherwise. Accordingly, while the preferred conductor arrangement is of the crossed grid type as discussed herein, it is likewise apparent that where a maximal variety of two dimensional display patterns is not necessary, as where specific standardized visual shapes (e.g., numerals, letters, words, etc.) are to be formed and image resolution is not critical, the conductors may be shaped accordingly (e.g., a segmented digit display).

The gas is selected to produce visible light and invisible radiation which may be used to stimulate a phosphor (if visual display is an objective) and a copious supply of charges (ions and electrons) during discharge.

In the prior art, a wide variety of gases and gas mixtures have been utilized as the gaseous medium in a number of different gas discharge devices. Typical of such gases include pure gases and mixture of $CO$; $CO_2$; halogens; nitrogen; $NH_3$; oxygen; water vapor; hydrogen; hydrocarbons; $P_2O_5$; boron fluoride; acid fumes; $TiCl_4$; air; $H_2O_2$; vapors of sodium, mercury, thallium, cadmium, rubidium, and cesium; carbon disulfide; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; and the so-called rare or inert Group VIII gases.

To obtain uniform resolution over the entire display surface of a gas discharge panel, it is imperative that the space between opposing walls of the gas envelope be uniform and that the walls of the chamber be sealed to provide a gas filled container.

Several methods of sealing such panels with various spacers therebetween appear in the prior art. For example, epoxy has been used as a sealant but produces impurities in the gas mixture which decreases the life of the panel. In situ fabrication of gas panels with granular solder glass as a sealant and spacers has also been utilized but uniform deposition of the solder glass is difficult and considerable numbers of cells are obliterated. In order to resolve these problems a soft glass rod or granular sealant and a hard glass rod spacer as has been used, as described in U.S. Pat. No. 3,778,127 (incorporated herein by reference) wherein the upper plate of the gas panel settles upon the spacing rods during a bakeout operation thus establishing a predetermined and uniform spacing within the envelope. However, such glass spacers are rigid, tend to crack and are detrimentally conspicuous to the observer.

Another glass sealing composition especially suitable for sealing together the two glass substrates of a multiple gas discharge display panel so as to provide a hermetically sealed ionizable gas chamber is disclosed in U.S. Pat. No. 3,734,702 (incorporated herein by reference) comprising a lead borosilicate solder glass containing 18% by weight of aluminum titanate which inhibits crystalization thus developing a seal with even stress concentration.

Several methods have been used in the past to seal the periphery of the two glass substrates of a gaseous discharge panel as well as maintain uniform gap spacing therebetween for the gas chamber. In one such method a composition in the form of a paste comprising a vitreous or devitrifiable solder glass with nitrocellulose and amyl acetate as the solvent-binder system is used as described in U.S. Pat. Nos. 3,088,834 and 3,127,278. In another method of sealing such substrates a solder glass is mixed with a vehicle consisting of equal parts of liquid poly (alpha methyl) styrene and terpineol in a ratio of 6 parts by weight of glass to one part of vehicle resulting in a paste having a viscosity of about 50,000 to 90,000 centipoises which is admirably suited for screen printing the sealing glass on the outer edges of the substrates since complete burn-out and curing of the composition results at about 572°F. as set forth in U.S. Pat. No. 3,625,733. A method of maintaining uniform gap spacing with low melting solder glass rods is described in U.S. Pat. No. 3,499,167 but such spacers tend to crush when the pressure and temperature fluctuates. Still another method of resolving the gap problem is claimed in U.S. Pat. No. 3,778,127 in which a soft glass rod sealant and a hard glass rod spacer is utilized wherein the upper plate of the gas panel settles upon the spacing rods during the bakeout operation thus establishing a predetermined and uniform spacing within the envelope. Unfortunately, such glass spacers provide no center support and are quite rigid thus tending to crack when stresses develope especially at high altitudes.

With the ever increasing use of gaseous discharge display panels in military aircraft and space ships which operate at altitudes above 35,000 feet, it has become imperative to develope a spacer system in such panels which will rectify the problems of spacer cracking and panel deformation at such altitudes.

SUMMARY OF THE INVENTION

This invention is predicated upon the discovery that the gap spacing of a gaseous discharge display panel can be made uniform and simultaneously provide improved support and minimal visibility in the active or firing area of said panel by inserting in the center of the viewing area between electrode lines on one of the glass substrates glass rods of from 3 to 40 mils in diameter and from 1 to 2 inches in length which soften at or below the periphery solder glass, then adhering the rods to the substrate by firing or use of a vehicle such as poly (alpha methyl) styrene and terpineol, applying solder glass with a softening point not less than that of the center glass rods to the periphery of the panel, inserting outside the viewing area but adjacent the periphery solder glass of said substrate stop gap glass rods of from 3 to 10 mils in diameter and about ½ inch long which soften at a temperature higher than the center glass rods or the periphery solder glass and finally completing the process by placing another glass substrate thereover and subjecting the entire assembly to a sealing cycle.

The rods employed can be made of either vitreous or devitrifiable glass. Illustrative compositions are disclosed hereinafter but typically the center or bridging rods soften at about 800°–850°F. considerably above the gas processing temperature of 750°F. whereas the stop gap glass rods soften at a temperature much higher in the range of 1300°F. while the sealing temperature of the periphery solder glass is about 800° to 950°F. The center glass rods are preferably somewhat larger than the desired gap so that during the sealing cycle both substrates are secured in the center area by the rods.

PREFERRED EMBODIMENTS

The solder glass compositions used in this invention can be any of those which are commercially available whether of the vitreous or devitrifiable type but the vitreous type is preferred. Exemplary solder glasses for use herein are described in U.S. Pat. Nos. 2,866,298; 2,931,142; 2,936,923; 3,061,664; 3,063,198; 3,080,328; 3,088,833; 3,088,834; 3,088,835; 3,127,278; 3,250,631; 3,291,586; 3,368,024 and 3,778,127. Typical specific solder glass compositions which have been used successfully in the practice of this invention are shown in the following table along with their softening points.

| Wt. % | A | B | C | D |
|---|---|---|---|---|
| PbO | 73.3 | 72.0 | 72.0 | — |
| $B_2O_3$ | 13.4 | 15.0 | 15.0 | 1.5 |
| $SiO_2$ | 13.3 | 4.0 | 2.0 | 67.6 |
| $Al_2O_3$ | — | 5.0 | 5.0 | 2.8 |
| ZnO | — | 4.0 | 6.0 | — |
| $Na_2O$ | — | — | — | 15.5 |
| CaO | — | — | — | 5.6 |
| MgO | — | — | — | 4.0 |
| BaO | — | — | — | 2.0 |
| $K_2O$ | — | — | — | 0.6 |
| $Fe_2O_3$ | — | — | — | 0.4 |
| Softening Point °F. | 845 | 811 | 800 | 1292 |

To prepare rods containing compositions A, B or C a melt containing the weight percent of each oxide hereinbefore designated is cast into glassy state rods ½ inch in diameter and redrawn into rods 3 to 40 mils in diameter and 2 inches long which are then used as the bridging or center rods in the viewing area of a gaseous discharge display panel. Alternatively, these same compositions can be cast into chips, ground to 200 U.S. Screen Series mesh or less (preferably 400 mesh), and mixed in a ratio of about 6 parts by weight of glass to one part by weight of vehicle containing equal parts by weight of poly (alpha methyl) styrene and terpineol for screen printing the periphery seal of the panel before subjecting said panel to the sealing cycle.

A melt of composition D is likewise prepared and cast into ½ inch diameter rods which are redrawn into rods of 3 to 6 mils in diameter and ½ inch in length and used as spacer stop gap rods to control the spacing between the ¼ inch thick glass substrates of each display panel.

The sealing cycle most frequently used involves heating the entire assembly — i.e., the center rods, stop gap rods, periphery seal material and substrates having a thick or thin film dielectric deposited thereon at about 3° to 7°F. per minute up about 800°F. to 960°F., holding the assembly at that temperature for about one hour and then cooling at the same rate to room temperature thus sealing the rods in the center of the panel as well as sealing the outer edges to provide the extra support which prevents ballooning of the panel at high altitudes.

The following examples are presented to illustrate rather than limit the invention.

EXAMPLE 1

A gaseous discharge display panel was assembled by placing glass rods of composition A in the viewing area between electrode lines on a glass substrate having a thin film dielectric deposited thereon. These rods were 7 to 12 mils in diameter and 2 inches in length. The substrate was heated to 850°F. to make these center or bridging rods soften and adhere thereto. Next, glass of composition A dispersed in a vehicle comprising equal parts by weight of poly (alpha methyl) styrene and terpineol in a ratio of 6 parts by weight of glass to one part by weight of vehicle was screen printed on the outside edges of the substrate. Adjacent the screen printed solder glass but outside the viewing area were placed stop gap rods of composition D about 5 mils in diameter and ½ inch in length. Another glass substrate ¼ inch thick was placed over the first substrate and the entire assembly was heated at 3°F. per minute up to 960°F., held at that temperature for one hour and then cooled at the same rate to room temperature thus causing the glass of composition A in the center and periphery of the panel to flow and seal the two substrates whereas the glass rods of composition D with a higher melting point of 1300°F. remained intact and provided a uniform gap between the substrates. In this manner, the panel was mechanically and thermally strengthened for high altitude use.

EXAMPLE 2

The same procedure as in Example 1 was followed except that the center or bridging rods in the viewing area were of composition B. The panel formed was admirably suited for use at altitudes above 35,000 feet since all of the glass rod spacers remained intact.

EXAMPLE 3

Example 1 was repeated except that glass of composition C was used for the center rods of the panel. The extra strength thus provided prevented the panel from expanding when subjected to high altitude conditions.

EXAMPLE 4

The procedure of Example 1 was followed except that both the periphery and the center glass were composed of composition B. The resulting panel had uniform gap spacing and the spacers were invisible. No cracking of the center seal or rod spacers occurred under the simulated conditions encountered at altitudes of 50,000 feet or more.

EXAMPLE 5

In this example, glass of composition B was screen printed on the periphery and glass of composition C was used in the center rods with glass of composition D for the spacer rods adjacent the periphery seal. A sealing cycle of 5°F. per minute to 930°F. held at that temperature for one hour followed by cooling at the same rate to room temperature was employed. No contamination of any of the seals was observed and the sealed panel was very satisfactory under fluctuating conditions of temperature and pressure.

EXAMPLE 6

A gaseous discharge display panel was assembled as in Example 1 except that the periphery seal was made of composition C glass and screen printed followed by heating at 750°F. to burn out the vehicle. Then center rods of composition C were adhered to the substrate with the poly (alpha methyl) styrene-terpineol vehicle previously described. Thereafter, the composition D gap spacer rods were placed adjacent the periphery seal and the whole assembly heated at a rate of 4°F. per minute to 860°F., held at that temperature for one hour and then cooled at the same constant rate to room temperature. All the seals were devoid of bubbles or foreign matter and the panel was vastly stronger due to the center rods which prevented deformation during the sealing cycle.

These examples illustrate the basic concept of the invention — i.e., the center or bridging rods must have the same or lower softening points than the solder glass used to seal the periphery of such panels whereas the stop gap rods adjacent the periphery must have a softening point much higher than either of the center glass rods or the periphery solder glass. Although the invention has been illustrated with vitreous glass compositions which reduce viewing objections to the panel, devitrifiable glass compositions may be substituted therefor if desired provided they are compatible with the substrate.

I claim:

1. A method of sealing the two glass substrates of a gaseous discharge display panel while simultaneously maintaining a uniform gas chamber gap therebetween and strengthening the panel for use at high altitudes which comprise the steps of:
   a. inserting in the center of the viewing area between electrode lines on one of the glass substrates glass rods which soften at or below the softening temperature of the periphery solder glass
   b. adhering said center glass rods to the substrate by heating
   c. applying solder glass with a softening temperature not less than that of said center glass rods to the periphery of the panel
   d. inserting outside the viewing area but adjacent the periphery solder glass of said substrate stop gap glass rods with a softening temperature higher than either the center glass rods or the periphery solder glass e. placing another glass substrate over the first substrate and f. subjecting the entire assembly to a heat sealing cycle.

2. A method as in claim 1 in which a vitreous solder glass is employed for the center rods, the periphery seal and the stop gap rods.

3. A method as in claim 2 in which the solder glass employed contains on a weight basis 73.3% PbO, 13.4% $B_2O_3$ and 13.3% $SiO_2$.

4. A method as in claim 2 in which the solder glass employed contains on a weight basis 72% PbO, 15% $B_2O_3$, 4% $SiO_2$, 5% $Al_2O_3$ and 4% ZnO.

5. A method as in claim 2 in which the solder glass employed contains on a weight basis 72% PbO, 15% $B_2O_3$, 2: $SIO_2$, 5% $Al_2O_3$ and 6% ZnO.

6. A method as in claim 2 in which the solder glass employed for the stop gap rods contains on a weight basis 1.5% $B_2O_3$, 67.6% $SiO_2$, 2.8% $Al_2O_3$, 15.5% $Na_2O$, 5.6% CaO, 4.0% MgO, 2.0% BaO, 0.6% $K_2O$ and 0.4% $Fe_2O_3$.

7. A method as in claim 1 in which a devitrifiable solder glass employed.

8. A method as in claim 1 in which the sealing cycle comprises heating the assembly at a constant rate of from 3° to 5°F. per minute to a maximum of 960°F., holding at that temperature for about one hour and then cooling at the same constant rate to room temperature.

9. A method as in claim 1 in which the center glass rods are about 7 to 12 mils in diameter and the stop gap rods are about 3 to 6 mils in diameter.

10. A method as in claim 1 in which the periphery solder glass is dispersed in a vehicle comprising equal parts by weight of poly (alpha methyl) styrene and terpineol in a ratio of 6 parts by weight of said glass to vehicle and applied by screen printing.

11. A method as in claim 10 in which the periphery solder glass is first applied and heated to burn out the vehicle and then the center glass rods are adhered to the substrate with the same vehicle before placing the stop gap rods adjacent the periphery.

* * * * *

UNITED STATES PATENT AND TRADEMARK OFFICE
CERTIFICATE OF CORRECTION

PATENT NO. : 3,947,260
DATED : March 30, 1976
INVENTOR(S) : Charles W. Salisbury It is certified that error appears in the above-identified patent and that said Letters Patent are hereby corrected as shown below:

Claim 1 at column 6, line 52 to column 7, line 6 is corrected to read as follows:

1. A method of sealing the two glass substrates of a gaseous discharge display panel while simultaneously maintaining a uniform gas chamber gap therebetween and strengthening the panel for use at high altitudes which comprise the steps of:

a. inserting in the center of the viewing area between electrode lines on one of the glass substrates glass rods which soften at or below the softening point of the periphery solder glass b. adhering said center glass rods to the substrate by heating c. applying solder glass with a softening point not less than that of said center glass rods to the periphery of the panel d. inserting outside the viewing area but adjacent the periphery solder glass of said substrate stop gap glass rods with a softening point higher than either the center glass rods or the periphery solder glass e. placing another glass substrate over the first substrate and f. subjecting the entire assembly to a heat sealing cycle.

Signed and Sealed this

Twenty-second Day of February 1977

[SEAL]

Attest:

RUTH C. MASON
*Attesting Officer*

C. MARSHALL DANN
*Commissioner of Patents and Trademarks*